United States Patent [19]

Moradian et al.

[11] Patent Number: 5,412,252
[45] Date of Patent: May 2, 1995

[54] SYSTEM AND METHOD FOR CONTROLLING TURBINE-GENERATORS BASED ON WHETHER COOLING REGULATORS ARE OFF-LINE

[75] Inventors: Ali Moradian, Lake Mary; Maurice A. Jenkins, Casselberry; Robert L. Frater, Longwood, all of Fla.

[73] Assignee: Westinghouse Electric Corporation, Pittsburgh, Pa.

[21] Appl. No.: 195,492

[22] Filed: Feb. 14, 1994

[51] Int. Cl.6 .................. E01D 19/00; G05B 15/00
[52] U.S. Cl. ..................... 290/40 R; 60/660; 60/663
[58] Field of Search ............... 60/660, 663; 290/1 R, 290/40 R

[56] References Cited

U.S. PATENT DOCUMENTS

| | | | |
|---|---|---|---|
| 3,959,635 | 5/1976 | Tanco | 290/40 R |
| 4,267,458 | 5/1981 | Uram et al. | 290/40 R |
| 4,445,180 | 4/1984 | Davis et al. | 290/40 R |
| 4,471,446 | 9/1984 | Podolsky et al. | 60/663 |
| 4,687,946 | 8/1987 | Jones | 290/40 R |

Primary Examiner—A. D. Pellinen
Assistant Examiner—Robert Lloyd Hoover

[57] ABSTRACT

Method and system for controlling the acceleration of a turbine-generator or limiting the load of the turbine-generator if a cooling regulator which regulates the cooling of the turbine-generator or auxiliary components is determined to be off-line.

18 Claims, 4 Drawing Sheets

SYSTEM AND METHOD FOR CONTROLLING TURBINE-GENERATORS BASED ON WHETHER COOLING REGULATORS ARE OFF-LINE

FIELD OF THE INVENTION

The present invention is embodied in a Digital Electro-Hydraulic ("DEH") system operating turbine-generators under Automatic Turbine Control ("ATC") or under Operator Automatic ("OA") modes of control.

BACKGROUND OF THE INVENTION

DEH systems are used to control the operation of turbine-generators during each stage of operation of the turbine-generator. Commonly assigned U.S. Pat. No. 4,687,946 to Jones describes DEH systems and turbine-generator systems and also cross references other commonly assigned patents. The '946 patent and the cross referenced patents listed in the '946 patent are hereby incorporated by reference for their teaching on DEH systems and turbine-generator systems. As used herein, turbine-generator refers to the combination of a turbine which generates rotary mechanical energy from the force of fluid or steam and a generator which converts the rotary mechanical energy generated by the turbine into electrical energy.

In turbine-generator systems, cooling water is provided to the turbine-generator and auxiliary components by cooling water regulators. Under load, the cooling water is used to help prevent the turbine-generators and auxiliary components from being damaged due to overheating. It has been found that the cooler regulators may be turned off-line during service of a turbine-generator or an auxiliary component or during a turning gear operation of the turbine-generator and not turned on-line thereafter. This situation may lead to damage to the turbine-generator or auxiliary components or may require the turbine-generator to be shutdown. In present DEH systems under ATC mode of control, the temperature of the cooling water is monitored and used to generate a hold if the temperature exceeds a certain threshold. The hold will prevent a turbine-generator from accelerating or increasing its load if the turbine-generator is in a speed or load changing mode. If a cooling regulator is off-line, however, the temperature of the cooling water may not reach an unacceptable level until the turbine-generator is fully accelerated or a load change performed. This scenario may cause shutdowns, restarts, or damage to the turbine-generator or auxiliary components.

In addition, in some DEH systems, if the system is in an OA mode of control, no holds are generated so that an unacceptable high temperature (i.e. exceeds threshold) may not prevent an operator from accelerating the turbine-generator or increasing or maintaining the current load on the turbine-generator.

SUMMARY OF THE INVENTION

The present invention is a system and method for preventing a turbine-generator from accelerating to synchronous speed or increasing or maintaining a load on the turbine-generator if any cooling regulators for the turbine-generator or auxiliary components are off-line.

According to one aspect of the invention, the cooling regulators are monitored to determine whether the cooling regulators are off-line. If any of the cooling regulators are off-line, the acceleration of the turbine-generator is limited.

According to another aspect of the invention, if any of the cooling regulators are off-line, the turbine-generator is prevented from accelerating.

According to another aspect of the invention, if at least one cooling regulator is off-line, a predetermined period of time is waited. If after waiting the predetermined period at least one cooling regulator is off-line, then the turbine-generator is shut down.

According to a second aspect of the invention, the cooling regulators are monitored to determine whether the cooling regulators are off-line. If any of the cooling regulators are off-line, the load on the turbine-generator is limited.

According to another aspect of the invention, if at least one cooling regulator is off-line, then the turbine-generator is prevented from accepting any load.

According to another aspect of the invention, if at least one cooling regulator is off-line, then a predetermined period of time is waited. If at least one cooling regulator is off-line after waiting the predetermined period of time, then the load on the turbine-generator is decreased by a predetermined percentage.

According to a further aspect of the invention, if at least one cooling regulator is off-line after decreasing the load on the turbine-generator by a predetermined percentage, then a second predetermined period of time is waited. If at least one cooling regulator is off-line after waiting the second predetermined period of time, then the turbine-generator is shut down.

DETAILED DESCRIPTION OF THE INVENTION

Figure 1:
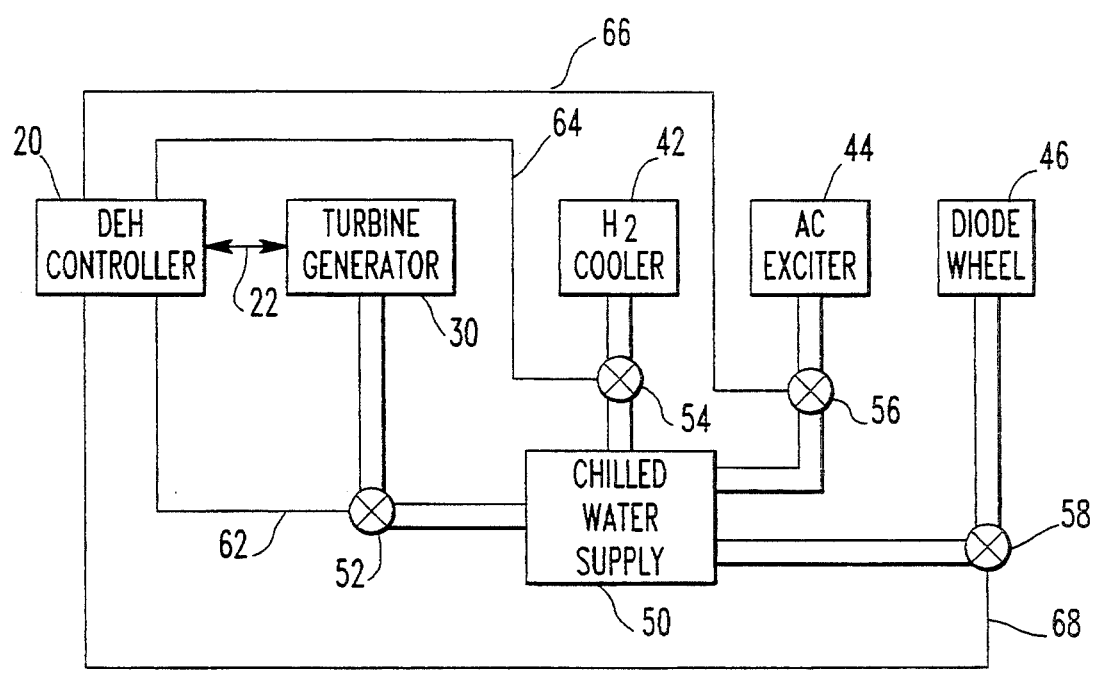
FIG. 1 is a block diagram of an exemplary configuration of a turbine-generator system.

An exemplary configuration of a turbine-generator system 10 embodying this invention is shown in FIG. 1. A brief overview of the invention is presented by reference to this exemplary turbine-generator system 10. The exemplary turbine-generator system 10 as shown in FIG. 1 only illustrates the limited interaction of certain components of a turbine-generator system as they relate to the present invention. Reference is made to the incorporated patents for further disclosure regarding other components and interactions in turbine-generator systems.

In this system 10, the DEH controller 20 is used to control the operation of the turbine-generator 30 during the phases of turning gear, reaching synchronous speed during acceleration, and placing a load on the turbine-generator 30. In the exemplary embodiment of the invention, a chilled water supply 50 provides cooling water to the turbine generator 30 and auxiliary components via water regulator valves 52, 54, 56, and 58. In the exemplary embodiment of the invention, the auxiliary components of the system 10 include a $H_2$ Cooler 42, an AC Exciter 44 and a Diode Wheel 46, each of which receive cooling water from the chilled water supply 50 via water regulator valves 54, 56, and 58, respectively.

As shown in FIG. 1, the DEH controller 20 receives status information 22, 62, 64, 66, and 68 from the turbine-generator 30 and the water regulator valves 52, 54, 56, and 58. The status information 22 from the turbine-controller indicates its current state of operation. The status information 62, 64, 66, and 68 from the water regulation valves 52, 54, 56, and 58 indicates whether the valves are on-line or off-line. In the exemplary embodiment of the invention, a valve is considered to be off-line if it is fully closed, otherwise, it is considered to be on-line.

Based on the status information from the turbine-generator 30 and the water regulator valves and the current mode of control (OA or ATC), the DEH controller 20, performing a preferred process of the present invention, may provide control signals to the turbine-generator 30 via the interface 22 which may limit the acceleration, load, or may shutdown the turbine-generator 30.

Figure 2:
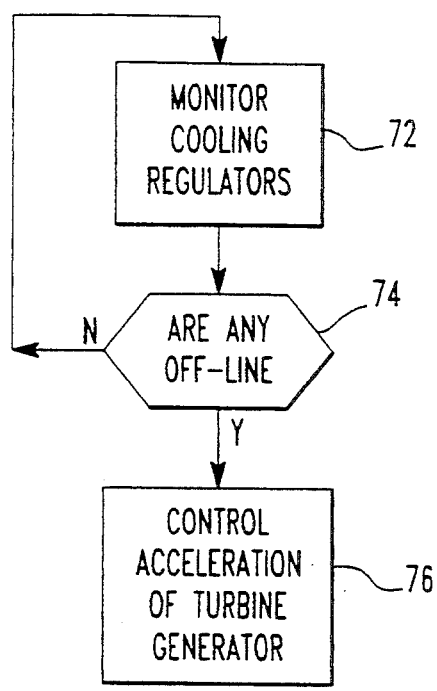
FIG. 2 is a flow diagram of an exemplary process of the invention for controlling the acceleration of a turbine-generator as a function of whether cooling regulators are off-line.

One preferred process of the present invention is explained with reference to FIG. 2. In the exemplary embodiment of the invention, this process is used when the turbine-generator is in turning gear and preparing to accelerate to synchronous speed and the DEH system is under the ATC mode of control. As shown in FIG. 2, in the first step 72, the DEH controller first monitors or determines the status of the cooling regulators which are the water regulator valves in the preferred embodiment of the invention. In the next step 74, while continuing to monitor the status of the cooling regulators, the DEH controller 20 determines whether any of the regulators are off-line ( in the preferred embodiment of the present invention, a regulator is off-line if it is fully closed). If one or more of the cooling regulators are off-line, in step 76, the DEH controller 20 will control or limit the acceleration of the turbine-generator 30. In the preferred embodiment of the invention, the DEH controller 20 will prevent the turbine-generator from accelerating if one or more of the cooling regulators are off-line.

Figure 3:
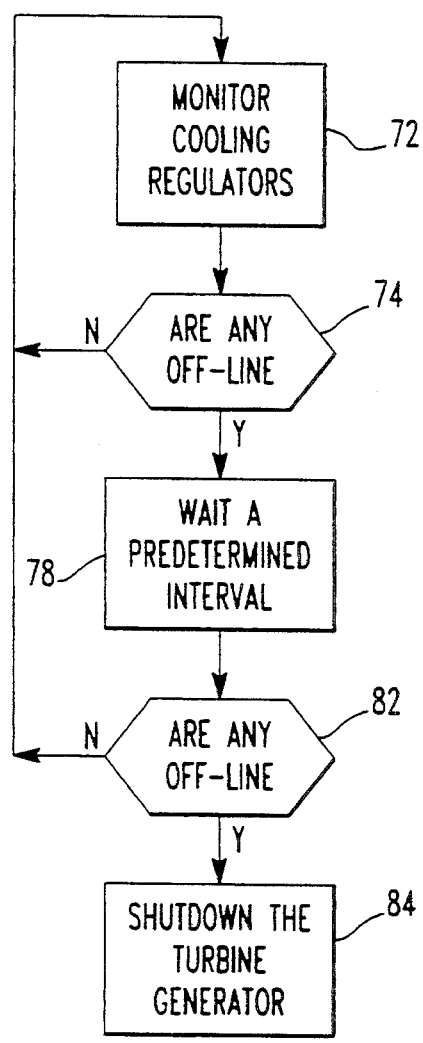
FIG. 3 is a flow diagram of another exemplary process of the invention for controlling the acceleration of a turbine-generator as a function of whether cooling regulators are off-line.

Another preferred process of the present invention is explained with reference to FIG. 3. In the exemplary embodiment of the invention, this process is used when the turbine-generator 30 is in turning gear and preparing to accelerate to synchronous speed and the DEH system is under the OA mode of control. As shown in FIG. 3, the first two steps, 72 and 74, are identical to the steps performed in previously described preferred embodiment. This preferred embodiment, after determining that one or more cooling regulators are off-line, in step 78, then waits a predetermined time interval. In the preferred embodiment of the invention, the DEH controller 20 informs an operator of the turbine-generator that one or more cooling regulators are off-line (not shown) and then waits a time interval sufficient to allow the operator to bring the off-line cooling regulators on-line.

After waiting the predetermined time interval in step 78, the DEH controller 20, in step 82, determines whether any cooling regulators are still off-line. In the preferred embodiment of the invention, the DEH controller 20 is determining whether the operator has successfully brought all off-line cooling regulators on-line. If the cooling regulators are on-line then the DEH controller 72 will return to step 72 and continue to monitor the status of the cooling regulators. If one or more cooling regulators are still off-line, however, then, in step 84, the turbine-generator is shutdown to prevent possible damage to the turbine-generator or and an auxiliary component. In the preferred embodiment of the invention, in step 84, the DEH controller 20 generates a turbine trip request which may cause the turbine-generator to shutdown.

Figure 4:
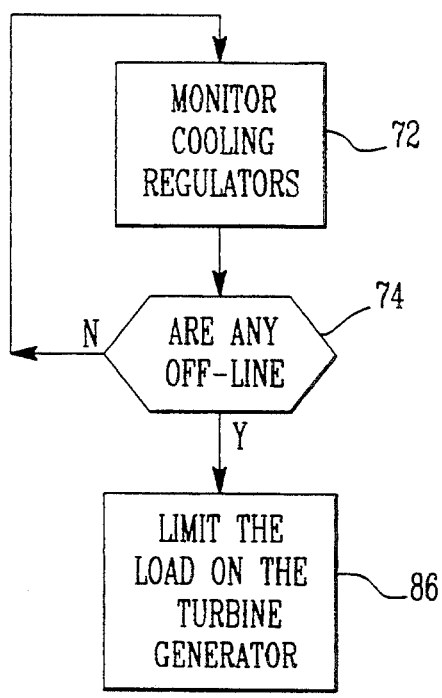
FIG. 4 is a flow diagram of an exemplary process of the invention for limiting the load on a turbine-generator as a function of whether cooling regulators are off-line.
Figure 5:
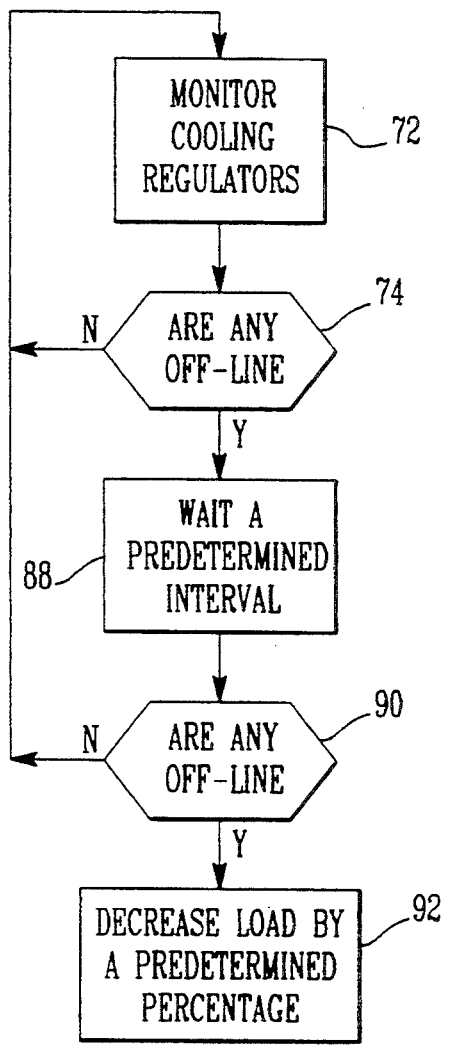
FIG. 5 is a flow diagram of another exemplary process of the invention for limiting the load on a turbine-generator as a function of whether cooling regulators are off-line.
Figure 6:
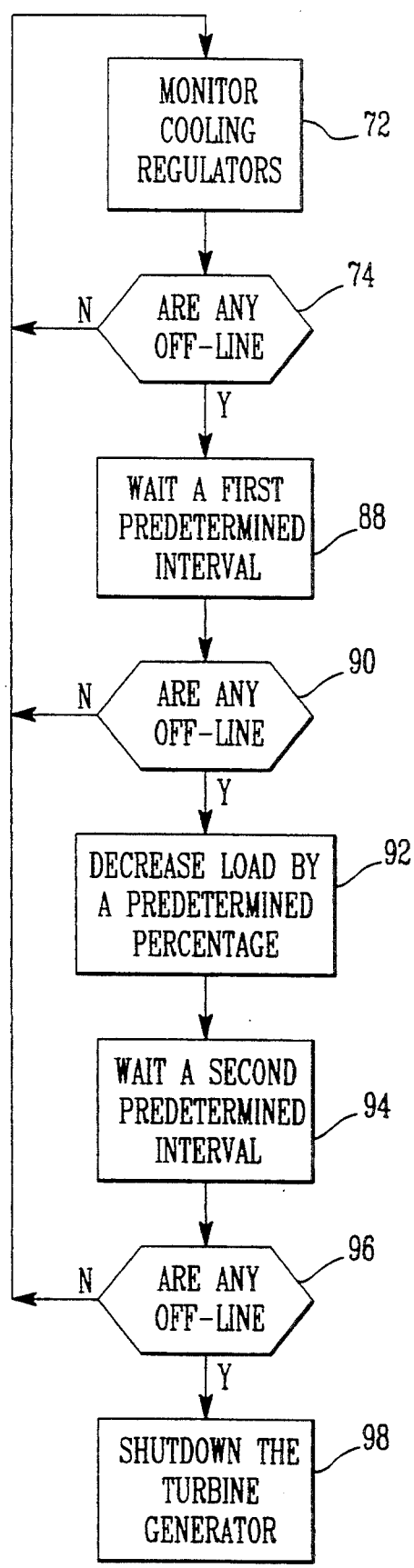
FIG. 6 is a flow diagram of an exemplary process of the invention for limiting the load on a turbine-generator as a function of whether cooling regulators are off-line which includes the exemplary process shown in FIG. 5.

In further preferred embodiments of the invention, once the turbine-generator has reached synchronous speed and is under load control, the DEH controller 20 may monitor the cooling regulators and control the loading of the turbine-generator based on whether one or more cooling regulators are off-line. FIG. 4 illustrates such a preferred embodiment of the invention. As shown in FIG. 4, the first two steps 72 and 74 are identical to the steps performed in previously described preferred embodiments. In this preferred embodiment, however, after determining that one or more cooling regulators are off-line, then, in step 86, the load on the turbine-generator is limited. In the preferred embodiment of the invention, the DEH controller 20 may limit the load on the turbine-generator 30 by not permitting any load or decreasing the load on the turbine-generator 30 or by requesting a turbine trip. FIGS. 5 and 6 illustrate other processes which limit the load according to preferred embodiments of the invention.

As shown in FIG. 5, the first two steps 72 and 74 are identical to the steps performed in previously described preferred embodiments. This preferred embodiment, after determining whether one or more cooling regulators are off-line, then in step 88, waits a predetermined time interval. As above, in the preferred embodiment of the invention, the DEH controller 20 informs an operator of the turbine-generator that one or more cooling regulators are off-line (not shown) and then waits a time interval sufficient to allow the operator to bring the off-line cooling regulators on-line.

After waiting the predetermined time interval in step 88, the DEH controller 20, in step 90, determines whether any cooling regulators are still off-line. In the preferred embodiment of the invention, the DEH controller 20 is determining whether the operator has successfully brought all off-line cooling regulators on-line. If after waiting the predetermined time interval, all the cooling regulators are on-line, then the DEH controller 22 will return to step 72 and continue to monitor the status of the cooling regulators. If one or more cooling regulators are still off-line, however, then, in step 92, the load on the turbine-generator is decreased by a predetermined percentage to prevent possible overheating of the turbine-generator or an auxiliary component. In the preferred embodiment of the invention, in step 92, the DEH controller 20 decreases the load on the turbine-generator 30 by 20% of its current load.

In a final preferred embodiment of the invention, the process shown in FIG. 5 is continued as shown in FIG. 6. As shown in FIG. 6, the first five steps 72, 74, 88, 90, and 92 are identical to the steps performed in previously described preferred embodiment. This preferred embodiment, however, after decreasing the load on the turbine-generator 30 by a predetermined percentage, then, in step 94, waits a second predetermined time interval. In this preferred embodiment of the invention, the DEH controller 20 again informs the operator of the turbine-generator that one or more cooling regulators are off-line and then waits a second predetermined time interval sufficient to allow the operator to bring the off-line cooling regulators on-line.

After waiting the second predetermined time interval in step 94, the DEH controller 20, in step 96, determines whether any cooling regulators are still off-line. In the preferred embodiment of the invention, the DEH controller 20 is determining whether the operator has successfully brought all off-line cooling regulators on-line after waiting the second predetermined time interval. If after waiting the second predetermined time interval all the cooling regulators are on-line, then the DEH controller 22 will return to step 72 and continue to monitor the status of the cooling regulators. If one or more cooling regulators are still off-line, however, then, in step 98, the turbine-generator 30 is shutdown to prevent possible damage to the turbine-generator or to an auxiliary component. In the preferred embodiment of the invention, in step 98, the DEH controller 20 generates a turbine trip request which may cause the turbine-generator to shut down.

Although the invention has been described in terms of an exemplary embodiment, the spirit and scope of the appended claims are unlimited by any details not expressly stated in the claims. For example, the DEH controller 20 may also determine that a cooling regulator is off-line based on whether the cooling regulator reacts appropriately as a function of the temperature of the cooling water, i.e., increases flow when the temperature increases.

What is claimed is:

1. A method for controlling the acceleration of a turbine-generator where the cooling of the turbine-generator and auxiliary components is controlled by at least one cooling regulator, said method comprising the steps of:
   a) monitoring said at least one cooling regulator to determine whether the cooling regulator is off-line; and
   b) controlling the acceleration of the turbine-generator as a function of whether said at least one cooling regulator is determined to be off-line.

2. A method according to claim 1 where step b) comprises the step of:
   preventing the turbine-generator from accelerating as a function of whether said at least one cooling regulator is determined to be off-line.

3. A method according to claim 1 where step b) comprises of the steps of:
   i) waiting a predetermined period of time following determination that said at least one cooling regulator is off-line; and
   ii) shutting down the turbine-generator as a function of whether said at least one cooling regulator is determined to be off-line after waiting the predetermined period of time.

4. A method according to claim 1 wherein the cooling regulator is a cooling water regulator valve and step b) comprises the step of:
   controlling the acceleration of the turbine-generator as a function of whether said at least one cooling water regulator valve is fully closed.

5. A method for controlling the load of a turbine-generator where the cooling of the turbine-generator and auxiliary components is controlled by at least one cooling regulator, said method comprising the steps of:
   a) monitoring said at least one cooling regulator to determine whether the cooling regulator is off-line; and
   b) limiting the load on the turbine-generator as a function of whether said at least one cooling regulator is determined to be off-line.

6. A method according to claim 5 where step b) comprises of the step of:
   preventing the turbine-generator from accepting any load as a function of whether said at least one cooling regulator is determined to be off-line.

7. A method according to claim 5 wherein the cooling regulator is a cooling water regulator valve and step b) comprises the step of:
   limiting the load on the turbine-generator as a function of whether said at least one cooling water regulator valve is fully closed.

8. A method according to claim 5 where step b) comprises of the steps of:
   i) waiting a predetermined period of time following determination that said at least one cooling regulator is off-line; and
   ii) decreasing the load on the turbine-generator by a predetermined percentage as a function of whether said at least one cooling regulator is determined to be off-line after waiting the predetermined period of time.

9. A method according to claim 8 further comprising the steps of:
   iii) waiting a second predetermined period of time following determination said at least one cooling regulator is off-line after decreasing the load on the turbine-generator by a predetermined percentage; and
   iv) shutting down the turbine-generator as a function of whether said at least one cooling regulator is determined to be off-line after waiting the second predetermined period of time.

10. A system for controlling the acceleration of a turbine-generator where the cooling of the turbine-generator and auxiliary components is controlled by at least one cooling regulator, said system comprising:
    at least one cooling regulator for controlling the cooling of the turbine-generator and auxiliary components;
    means for monitoring said at least one cooling regulator to determine whether the cooling regulator is off-line; and
    acceleration control means for controlling the acceleration of the turbine-generator as a function of whether said at least one cooling regulator is determined to be off-line.

11. A system according to claim 10 where said acceleration control means includes:
    means for preventing the turbine-generator from accelerating as a function of whether said at least one cooling regulator is determined to be off-line.

12. A system according to claim 10 where said acceleration control means includes:
   means for waiting a predetermined period of time following determination that said at least one cooling regulator is off-line; and
   means for shutting down the turbine-generator as a function of whether said at least one cooling regulator is determined to be off-line after waiting the predetermined period of time.

13. A system according to claim 10 wherein the cooling regulator is a cooling water regulator valve and the acceleration control means includes:
   means for controlling the acceleration of the turbine-generator as a function of whether said at least one cooling water regulator valve is fully closed.

14. A system for controlling the load of a turbine-generator, said system comprising:
   at least one cooling regulator for controlling the cooling of the turbine-generator and auxiliary components;
   means for monitoring said at least one cooling regulator to determine whether the cooling regulator is off-line; and
   load limiting means for limiting the load on the turbine-generator as a function of whether said at least one cooling regulator is determined to be off-line.

15. A system according to claim 14 where said load limiting means includes:
   means for preventing the turbine-generator from accepting any load as a function of whether said at least one cooling regulator is determined to be off-line.

16. A system according to claim 14 wherein the cooling regulator is a cooling water regulator valve and said load limiting means includes:
   means for limiting the load on the turbine-generator as a function of whether said at least one cooling water regulator valve is fully closed.

17. A system according to claim 14 where said load limiting means includes:
   means for waiting a predetermined period of time following determination that said at least one cooling regulator is off-line; and
   means for decreasing the load on the turbine-generator by a predetermined percentage as a function of whether said at least one cooling regulator is determined to be off-line after waiting the predetermined period of time.

18. A system according to claim 17 further comprising:
   means for waiting a second predetermined period of time following determination said at least one cooling regulator is off-line after decreasing the load on the turbine-generator by a predetermined percentage; and
   means for shutting down the turbine-generator as a function of whether said at least one cooling regulator is determined to be off-line after waiting the second predetermined period of time.

* * * * *